Aug. 11, 1953    H. RODMAN, JR    2,648,637
METHOD OF PRODUCING ACTIVATED CARBON
Filed Aug. 6, 1948
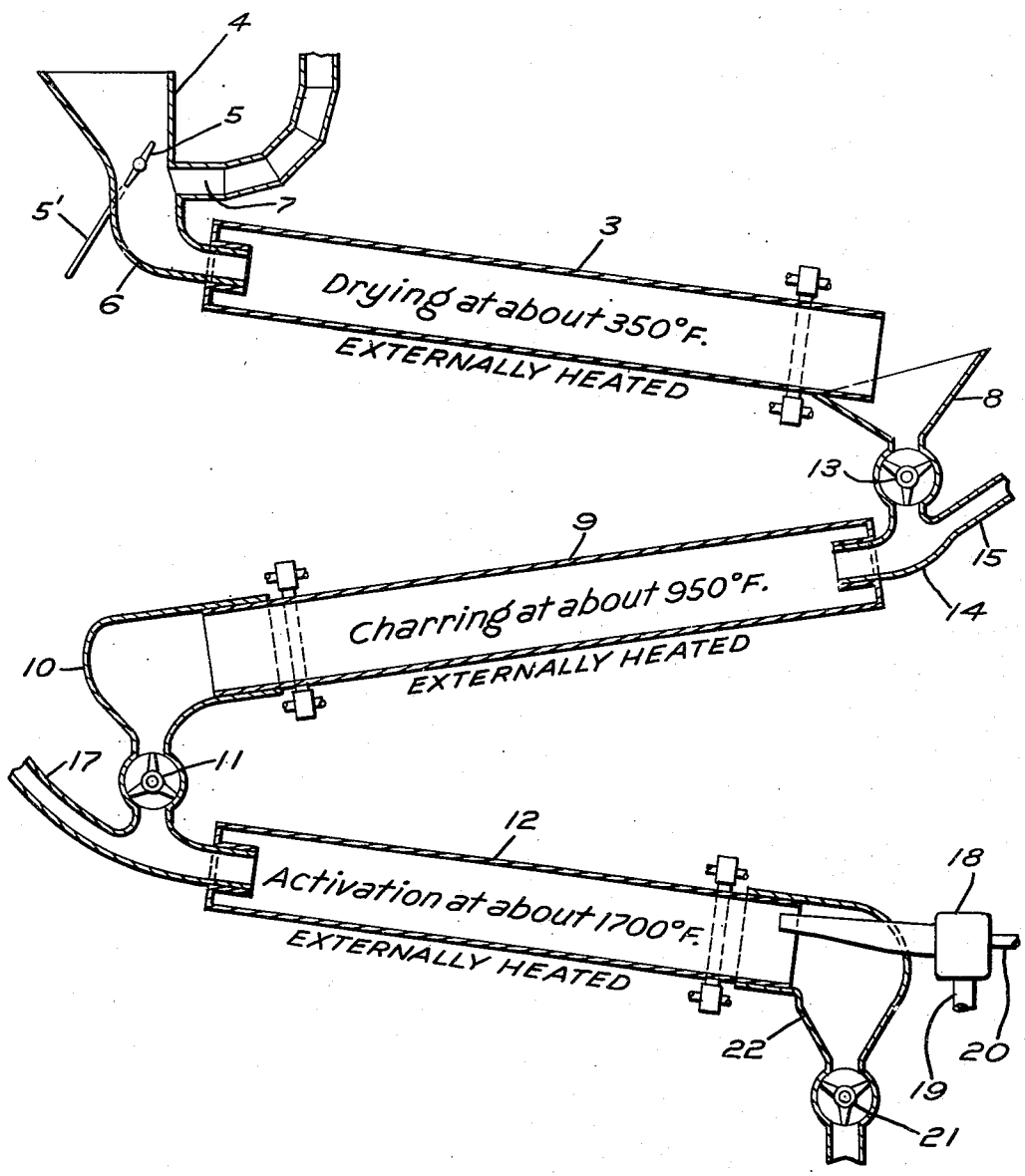
INVENTOR
Hugh Rodman Jr.
by Green McCallister & Miller
his attorneys in fact Patented Aug. 11, 1953

2,648,637

UNITED STATES PATENT OFFICE 2,648,637

METHOD OF PRODUCING ACTIVATED CARBON

Hugh Rodman, Jr., Pittsburgh, Pa., assignor to Rodman Chemical Company, Verona, Pa., a corporation of Pennsylvania Application August 6, 1948, Serial No. 42,896

8 Claims. (Cl. 252—421)

1

This invention relates to the production of activated carbon and has for an object to produce such carbon in a new and improved form. The invention also relates to the production or development of an effective procedure for making activated carbon in the new and improved form.

A specific object of my invention is to produce granular carbon in the form of substantially spherical charred pellets which are hard, tough and resistant to abrasion and which after activation retain much of the great hardness and strength developed during the charring and subsequent heating up to an activating temperature.

A further object is to produce or develop a highly effective commercial procedure for making substantially round, charred carbonaceous pellets within any desired size limits, which after being activated retain their hardness, strength and abrasion resistant characteristics.

In addition to the fundamental requirement that granular activated carbon have adequate adsorptive capacity, there are several other characteristics which are of great importance to the successful use of such carbon.

One such characteristic is a combination of hardness and toughness which enables the carbon particles to resist abrasion and crushing. Most granular carbons are used in work with gases. Usually the stench or solvent-laden air or other gas is forced through a packed bed or mass of the carbon particles. If the particles are reduced to smaller fragments or dust, these smaller pieces obstruct the flow of gas through the bed. A soldier wearing a gas mask must breathe through a cannister containing a confined mass of such carbon particles. If his breathing is obstructed to any considerable degree he becomes almost useless, and reduction of these carbon particles to dust-like or even small pieces may cause such obstruction.

In the recently developed hypersorption process, large volumes of activated carbon granules are in continuous motion. For such a process to be commercially practicable, the carbon particles must have great resistance to abrasion and crushing in order to withstand repeated handling and to avoid the formation of dust or small pieces which may partially obstruct the flow of gases being forced through the moving carbon.

A second characteristic which is important for the same reasons as the first is the shape of the particles. The most desirable shape is that which permits the freest possible passage of gases through a packed bed. For many years most hard granular activated carbons have been in the form of crushed fragments of irregular shape.

2

One of the most generally accepted varieties was made by charring cocoanut shells, crushing this char, and then steam-activating the most useful sizes of crushed particle, selected by screening. A recent improvement has been the production of activated carbon by extrusion of a plastic carbonaceous mass in the form of small cylinders having a length or height which usually varies between one or two diameters. These cylinders, after being charred and activated, are packed into confined masses or beds and offer much less resistance to the passage of gas than do beds of comparable size composed of irregular fragments. The ends of these cylinders are flat or somewhat irregular in shape and in any event a bed or mass of such cylinders does not have the aerodynamic advantage obtained in a mass of particles of substantially uniform size which present smooth and uniformly curved surfaces to the gases moving through the mass.

A third characteristic which is important to most users of granular activated carbon is the apparent density of the masses of packed carbon particles. Other things being equal, it is advantageous to pack a given weight of carbon particles into as small a volume as possible. The corollary to this is that the greater the weight of carbon particles which may be packed into a given container, other things being equal, the greater will be the adsorptive capacity of that container.

Now all three of these desirable characteristics may be achieved by forming the carbon pellets into substantially spherical particles of approximately uniform size. Spherical particles provide maximum strength and resistance to crushing and abrasion. Within any given limited size range of particles having uniform density, a mass of spheres offers less resistance to gas flow than a corresponding mass of cylinders, and cylinders offer less than irregular fragments.

With particles of uniform density and approximately uniform size, the resistance per unit of weight offered by them to the passage of gases through a mass of them is in the approximate following proportions:

Spherical particles _____ 1.0
Cylindrical particles _____ 2.5
Irregular fragments _____ 3.3

A fourth advantage of the spherical or substantially spherical shape within any narrowly limited size range, lies in the fact that such spheres in packed beds offer less opportunity for channelling to develop than any other shape. The avoidance of channelling or short-circuiting is of great importance. Other advantages are gained by sphericity because round pellets flow more readily than any other shape and because they settle much more quickly to their final resting places in packed beds than do particles of any other shape, and resettle quickly if disturbed.

While it is possible to form almost round particles of substantially uniform size with special briquetting machines such as the Stokes tableting press, the cost of making such particles or tablets in the sizes which are considered desirable for use in absorption processes, is commercially prohibitive. Presumably active carbon in this highly desirable shape is not being produced because of fabricating difficulties or because manufacturers do not know how to form such a pellet economically and at the same time produce a pellet which can retain enough mechanical strength after activation to be classed as "hard" carbon.

Hard, carbonaceous, charred masses may be made in a number of ways. For example, many pulverized carbons or carbonaceous materials may be mixed with any one of a number of different binders as a preliminary to briquetting either by the use of briquetting machines, extrusion presses or other devices. When masses or particles formed in this way are heated to 1500° F. or more they will char and form relatively hard particles. In making activated carbon, the problem is to form relatively small spherical particles which are hard, tough and resistant to abrasion and which retain these characteristics after they have been activated. While it is possible to form hard, tough carbon particles by charring and heating a large number of different carbonaceous mixtures to an elevated temperature such as 1700° F., very few such mixtures when so treated produce pellets which retain their toughness and hardness when they are activated. Coal or wood tar pitch is, in my experience, the most effective binder for carbonaceous materials in producing hard pellets capable of retaining much of this hardness after being subjected to activation.

A fundamental difficulty encountered with tars or pitches used as binders in the operation of making charred particles, is that during the charring stage the tar or pitch passes through a plastic or fluid state before it sets permanently. This allows the particles to deform and, under usual charring procedures, the deformation is so great that the whole mass of particles flows and fuses into a solid mass.

I have overcome this difficulty and solved the problem of forming relatively small spherical pellets economically and in commercial quantities without the necessity of employing complicated or expensive apparatus. My solution consists in employing two binders for pulverized carbonaceous material one of which is mixed with the pulverized carbonaceous material while in a comminuted and dry state, and the other of which is a sticky binder which when added to the dry mixture causes the particles thereof to adhere to each other. My invention, therefore, broadly consists in pulverizing two carbonaceous materials, one of which is capable of being effectively activated by the usual activating reagents and procedures after being charred. The other material is a wood tar pitch or a coal tar pitch, preferably of the type known as core pitch. The pitch is resistant to activation, after being charred, and may be designated as the permanent binder. I dry mix the pulverized materials to form a substantially homogeneous dry mixture. I then add a sticky binder to the dry mixture, i. e., a binder which causes the particles of the mixture to adhere to each other. This binder may be designated as the temporary binder and is preferably a water solution of molasses, glucose or any other carbohydrate which is readily soluble and which does not crystallize as the solution dries. The liquid binder is added to the dry mixture and the wet mixture thus formed is processed so as to form adherent masses in the form of substantially spherical pellets. The pellets so formed are dried, carbonized or charred and then activated.

Thus my invention contemplates employing two binders, one of which functions as an adhesive binder for the dry mixed materials (including the powdered pitch) and also acts to retain the form of the pellets after they are formed and prevents the fusion thereof into a solid or fused mass during the period in which the permanent binder (pitch) is passing through the plastic state and before it is converted into a permanent binder by the charring operation. In this way, I am able to effectively employ tars and pitches as the permanent binder and to produce small spherical pellets, the constituents of which cohere by reason of the cohesive force of the frame-like structure formed by the charred pitch which is substantially uniformly distributed throughout each pellet. The pellets so produced are hard and tough and resist abrasion and they retain all of these characteristics to a high degree after they are subjected to an activating process.

A specific embodiment of my invention is as follows:

Dry mix together in any suitable device such as a ball mill, vaned drum or cone blender about 70 parts by weight of low ash anthracite coal which has been pulverized until it will readily pass a 200 mesh screen and about 30 parts by weight of coal tar pitch of the grade known as core pitch (softening point, cube in air, about 150° C.), which has been pulverized until it will pass a 100 mesh screen. Then prepare a water solution of molasses having a specific gravity of about 1.100 or 1.150. In a kneading or blending device such as a dough mixer knead together a portion of the dry mixture and solution in the approximate proportion of 100 grams of powder to about 40 cc. of solution. Rub this moistened powder mixture through a screen, for example 10 mesh. Then place the moist mixture in a tumbling device such as a tumbling barrel or a cement mixer, with vanes removed, rotating on a horizontal or slightly inclined axis. Revolve the tumbling device at low speed, for example 15 or 30 R. P. M. For a while the tumbling moist powder appears to be non-adhesive, but after a time it starts to form spheres. The spheres increase in size as the tumbling continues and when they have grown to approximately the desired size, for instance ⅛" diameter, their growth is stopped by adding some dry powder, for example from the initial dry mixture.

The pellets are tumbled until they are reasonably smooth and they are then screened or otherwise graded as to size. The undersize and oversize pellets are returned to the kneading device for recycling.

The selected pellets are dried preferably in warm air and become firm enough so that they may be easily handled. The dried pellets are then charred for about an hour at about 950° F. out of contact with air; then heated to about 1500° F., also out of contact with air, and then activated. The last heating is preferably accomplished rapidly and may be performed in the activating apparatus. The activation is preferably accomplished in a gaseous atmosphere made by burning natural gas and air in such proportion that the flame is strongly reducing and then enriching this mixture with steam in such added proportion that the total mixture has a temperature of approximately 1700° F. Such carbon pellets, even though they have suffered a substantial weight loss (for example a loss of 70%) in the activation process, are still firm and tough as compared to most commercially available carbons activated to an equivalent degree, and they are highly resistant to abrasion. Spherical pellets formed in this way are capable of absorbing about 90 percent of their own weight of carbon tetrachloride from air containing very small percentages of this common solvent and maintained at normal atmospheric temperatures.

Another embodiment of my invention may be carried forward as follows:

Dry mix together 80 parts by weight of bituminous coking coal which has been pulverized to pass a 200 mesh screen, and 20 parts by weight of core pitch pulverized to pass a 100 mesh screen. Place a portion of this dry mixture in a tumbling device and apply thereto a glucose solution of a specific gravity of about 1.100. Tumble the moist mixture and as pellets start to form, stop their growth by adding a small quantity of the initial dry mixture. Screen out the small pellets, for example, those between 20 and 40 mesh size and retain them as nuclei for finished particles. Place these nuclei in the tumbling device, spray them lightly with glucose solution preferably employing a spray gun. Add to the thus moistened pellets a small amount of the dry mixture while tumbling them. Again spray the tumbling mass and again add thereto dry powder from the initial mixture. Continue this alternation and in this way build up the pellets until they approach the desired size. If the wet and dry additions have been skillfully made, the whole mass of pellets will be of surprisingly uniform size and almost perfectly spherical.

Screen out the desired size and return the undersize to be built up some more. There will be practically no oversize. These pellets are air dried for instance at about 350° F. and then charred at about 950° F. for about an hour out of contact with air, heated to about 1500° F. also out of contact with air, and then activated with steam at about 1750° F. If such pellets are activated until they have suffered about 50 percent weight loss, they will have a retentivity approximately the same as high grade gas mask activated carbon made from charred cocoanut shell and be hard, tough and highly resistant to abrasion.

Both these procedures produce hard, active carbon of satisfactory apparent density in a very desirable shape which I believe was hitherto not economically possible. In both these examples the temporary binder makes possible the formation of the pellets and holds them together until the permanent pitch binder can begin to function during the charring stage. During the part of the charring stage at which the pitch is very fluid and would allow the spherical particles to deform and fuse together, the dried and charring temporary binder remains sufficiently rigid so that such deformation is prevented. After the pitch has charred and set to a firm coke it performs the function of a binder in holding the charred activation material in pellet form by forming a frame-like structure throughout each pellet. This structural frame resists activation, or at least responds less readily to activation process than the coal, but it contributes to those characteristics of the pellets which cause them to effectively resist crushing and abrasion even after they have been activated. Where wood tar pitch is employed as the permanent binder, the resulting pellets are not quite as rugged, but the wood tar pitch is much less resistant to activation than coal tar pitch, thus increasing the absorptive capacity of the pellets.

It will be apparent to those skilled in the art that many of the carbohydrates may be employed as the temporary binder. It should, however, be readily soluble in a suitable solvent such as water and preferably one which does not crystallize on being subjected to a drying operation. It will be apparent that the size of the spherical pellets is not critical, although it appears that activated spherical pellets within the size limit of from about $\frac{1}{16}''$ to about $\frac{3}{16}''$ in diameter will be suitable for use and highly effective in the majority of commercial operations in which activated carbon is employed. It will also be apparent that various forms of apparatus may be employed in carrying out my invention.

In the drawings I have illustrated by a diagrammatic sectional view one form of apparatus which may be employed in drying and further processing the spherical pellets after they are formed. As there shown, the raw or moist pellets are delivered to the upper end of a rotating metallic cylinder 3 from a hopper 4. Delivery from the hopper to the cylinder may be controlled by a gate 5. Any suitable means may be employed for rotating the cylinder 3 and its inclination may be varied to suit operating conditions. The cylinder is heated externally by any suitable means.

The lower end of the cylinder 3 is open to the atmosphere and the upper end thereof is so vented to the atmosphere so as to provide a free flow of air through the cylinder and in contact with the tumbling, heated mass of spherical pellets during the drying operation. As shown, the hopper 4 communicates with a passage 6 which is provided with an air vent 7 so located as to contribute to a free flow of air through the cylinder without interfering with the delivery of pellets from the hopper to the cylinder.

The dried pellets are discharged from the lower end of the cylinder 3 into a hopper 8, and are delivered from that hopper to a second metallic cylinder 9 which is also rotated and externally heated. This cylinder may be termed the carbonizing cylinder in that the tumbling pellets moving therethrough are subjected to a coking temperature, i. e., a temperature of about 950° F. and the inclination and rotation of the cylinder are such that the individual pellets are retained in the cylinder for about 45 minutes.

Air is excluded from the interior of the cylinder 9 and the volatiles resulting from the charring of the carbonaceous material passing through the cylinder are collected in any suitable manner and used as fuel in the various heating operations employed in the processing and activation of the pellets. For this reason both the lower and upper ends of the cylinder 9 are sealed. As shown, the lower end delivers into a sealed hopper-like container 10 the lower end of which communicates with the casing of a rotatable star valve 11 so arranged as to permit the delivery of pellets from the container 10 to an activating cylinder 12, but to substantially prevent the flow of air or other fluids into the cylinder 9.

The upper end of the cylinder 9 is also sealed and the delivery of pellets from the hopper 8 into the cylinder is accomplished by means of a valve 13 of the same type as the valve 11. The valve 13 delivers pellets into a receptacle 14 which is in sealing engagement with the cylinder 9 and is provided with a vent passage 15 through which volatiles resulting from the carbonizing operation are conducted to a gas washer or other gas processing or storage apparatus.

The upper end of the cylinder 12 is in sealing engagement with a receptacle 16 to which pellets are delivered by the valve 11, and from which the water-gas and other fluids resulting from the activating process are delivered to storage or other gas receiving equipment. The receptacle 16 is, therefore, provided with a fluid delivery passage 17 to which the gases from the cylinder 12 are delivered. The cylinder 12 is also an externally heated metal cylinder which is rotated so as to subject the charred pellets passing therethrough to a stirring or tumbling action during their activation. The inclination and rate of rotation of each of the cylinders 9 and 12 is such as to insure the desired movement of the pellets and that the individual pellets are retained therein for a desired period of time.

I have shown the lower end of the cylinder 12 as provided with a gas burner 18 which receives gas through a pipe 19 and steam through a pipe 20. The air passages of the burner are so adjusted that a highly reducing flame is projected by it into the lower end of the cylinder 12 and steam is delivered to the cylinder under conditions such as to maintain a gas temperature within the cylinder of about 1700° F. The lower end of the cylinder 12 is sealed off from the atmosphere and a star valve 21 such as the valve 11, is employed for delivering the activated pellets from the sealed receptacle 22 at the lower end of the cylinder.

As previously stated I prefer to complete the charring of the forced pellets by subjecting them to a rapid heating at about 1500° F. This may be accomplished by providing an additional cylinder between the cylinders 9 and 12, but the high temperature maintained in the cylinder 12 will ordinarily accomplish the desired result.

I have referred to tumbling devices and also to tumbling the formed pellets in the cylinders 3, 9 and 12. It will be apparent to those skilled in the art that during the pellet drying, pellet charring and the activating operations, apparatus other than the rotating cylinders may be employed. It, however, is desirable to agitate the mass of pellets during both the drying and the charring operations. This can be best accomplished in a tumbling device such as a rotating cylinder. It should also be noted that the term "tumbling" as applied to a mass of pellets, means a movement in the mass such that individual pellets are periodically, though frequently, mechanically lifted from a submerged position within the mass and moved to the top or at least the upper portion of the mass, and are then again moved to a submerged position within the mass while approximating a rolling movement.

While I have described specific embodiments of the procedure constituting my invention, it will be apparent that various changes by way of both additions and omissions may be made in the procedural steps here outlined without departing from the spirit and scope of my invention as defined by the appended claims. It will also be apparent that the procedure here described in connection with the diagrammatic drawings forming a part hereof, will result in a considerable saving both because it contemplates employing as fuel the volatiles released from the carbonaceous material during the charring operation, and also because the formed pellets are not subjected to appreciable cooling after they are initially heated during the drying operation and until activation is completed.

What I claim is:

1. A method of making activated carbon in the form of hard, tough, substantially spherical pellets, which comprises dry-mixing comminuted carbonaceous material capable of effective activation and a comminuted carbonaceous material resistant to activation selected from the group containing wood tar pitch and coal tar pitch; adding a liquid carbohydrate binder to such dry mixture and tumbling the wet mixture so formed to produce spherical pellets; drying pellets so formed; then carbonizing all the carbonaceous material and thereby converting such of said material as is resistant to activation, into a charred bonding structure within each such pellet; and then subjecting a mass of the charred and permanently bonded pellets to the action of an activating gas while maintaining such mass at an activating temperature.

2. A process of making hard, abrasion-resistant activated pellets in substantially spherical form, which comprises mixing a comminuted mass of carbonaceous material selected from the group containing bituminous coking coal and anthracite coal with a comminuted mass of carbonaceous binding material selected from the group including wood tar pitch and coal tar pitch and tumbling such mixture while delivering thereto a sticky binder of water soluble carbohydrate selected from the group containing molasses and glucose, to thereby produce a mass of substantially spherical pellets; tumbling pellets so formed while subjecting them to a drying temperature; tumbling the dried and heated pellets out of substantial contact with air while subjecting them to a temperature sufficient to convert the carbonaceous binding material into a coke-like frame within each such pellet; then subjecting the hot charred pellets to the action of an activating gas while tumbling the same and while maintaining them at an activating temperature.

3. A method of making activated carbon in the form of hard, abrasion-resistant, substantially spherical pellets which consists in dry mixing comminuted core pitch with comminuted carbonaceous material selected from the group containing bituminous coal and low ash anthracite coal; adding a carbohydrate binder selected from the group containing molasses and glucose to such mixture while tumbling the same to thereby form a mass of substantially spherical pellets; drying a mass of such pellets to render said binder effective; substantially excluding air from a mass of such dried pellets while subjecting the same to a temperature of about 950° F. to carbonize such pellets and to convert the core pitch contained in such pellets into a charred frame-like structure extending throughout each such pellet; and then subjecting the charred pellets to a flow of activating gas while maintaining them and the gas at an activating temperature.

4. A method of making activated carbon in the form of hard, abrasion-resistant, small substantially spherical pellets, each having a diameter ranging from about $\frac{1}{16}''$ to about $\frac{3}{16}''$, which comprises comminuting a carbonaceous material capable of effective activation in a charred state; comminuting a second carbonaceous material resistant to activation in a charred state and selected from the group containing wood tar pitch and coal tar pitch; dry mixing such comminuted materials to form a substantially homogeneous mixture thereof; adding to such mixture a sticky, liquid binder formed of a water solution of a carbohydrate selected from the group containing molasses and glucose; tumbling the mixture so formed to produce small spherical pellets; drying a mass of such pellets; agitating a mass of such dried pellets while excluding air therefrom and while subjecting them to a temperature sufficient to carbonize all the carbonaceous material contained in the pellets of the mass and to thereby convert such activation-resistant material into a charred bonding structure within each pellet; and then subjecting a mass of charred and bonded pellets to the flow of an activating gas while maintaining such mass at an activating temperature.

5. A method of producing activated carbon in the form of hard, abrasive-resistant, small spherical pellets, which comprises pulverizing bituminous coal and coal tar pitch; mixing the pulverized materials to form a substantially homogeneous mixture thereof; adding a sticky liquid carbohydrate binder to such mixture; tumbling the mixture so treated to form a mass of small spherical pellets; drying a mass of such pellets by heating the same to a temperature of about 350° F. while tumbling them in the presence of air; subjecting the dried pellets to a charring temperature while tumbling them out of contact with the air; and then without substantially cooling the charred pellets, subjecting them to a flow of steam while maintaining such pellets and such steam at an activating temperature.

6. A method of making activated carbon in the form of hard, tough, abrasion-resistant pellets of substantially uniform shape and size, which consists in intimately dry mixing comminuted coal and comminuted pitch; tumbling such mixture while adding thereto a binder formed of a water solution of a water soluble carbohydrate which does not crystallize on drying; tumbling the wetted mixture to thereby produce a mass of pellets of substantially spherical shape and substantially uniform size; drying a mass of such pellets to thereby render the carbohydrate binder effective; subjecting the dried pellets to a carbonizing temperature to carbonize all the coal and pitch of each pellet and to convert the pitch to a permanent binding structure within each pellet and then subjecting a mass of the charred pellets to a flow of activating gas while maintaining them at an activating temperature.

7. A method of making activated carbon in the form of hard, tough, abrasion-resistant pellets of substantially uniform shape and size, which consists in intimately dry mixing comminuted carbonaceous material selected from the group including anthracite and bituminous coal, and a comminuted permanent binder, selected from the group including coal tar pitch and wood tar pitch; tumbling said mix while adding thereto a water solution of water soluble carbohydrate binder and thereby producing a mass of separate pellets of substantially uniform shape and size; drying such pellets to thereby render the carbohydrate binder effective as a temporary binder for the mixture of comminuted material forming each such pellet; charring a mass of the dried pellets while agitating the same by subjecting such mass to a temperature sufficient to carbonize all the carbonaceous material of such pellets and to convert such permanent binder into a charred binding structure permeating each such pellet; and then subjecting the charred and permanently bonded pellets to an activating temperature while subjecting them to a flow of activating gas at about 1750° F.

8. A method of making activated carbon in the form of substantially spherical, hard, tough, abrasion-resistant pellets, which consists in pulverizing carbonaceous material selected from the group containing anthracite and bituminous coal and a carbonaceous binding material selected from the group including wood-tar pitch, coal-tar pitch and core pitch; dry mixing the powdered materials so formed to produce a substantially homogeneous mixture thereof; adding a sticky binder thereto in the form of a solution of material from the group including molasses, glucose and other water soluble carbohydrates; tumbling the wetted mixture so formed to produce a mass of substantially spherical pellets; drying a mass of such pellets; tumbling a mass of the dried pellets while subjecting the same to a carbonizing temperature of about 950° F. and while excluding air therefrom; and then heating the pellets to about 1750° F. while excluding air therefrom and subjecting the same while so heated to a flow of steam at about 1750° F.

HUGH RODMAN, Jr.

References Cited in the file of this patent

UNITED STATES PATENTS

| Number | Name | Date |
|---|---|---|
| 1,478,987 | Morrell | Dec. 25, 1923 |
| 1,501,108 | Hamister | July 15, 1924 |
| 1,893,555 | Komarek et al. | Jan. 10, 1933 |
| 1,902,986 | Barker | Mar. 28, 1933 |
| 1,929,860 | Trent | Oct. 10, 1933 |
| 2,008,144 | Morrell | July 16, 1935 |
| 2,546,903 | Morrell | Mar. 27, 1951 |

FOREIGN PATENTS

| Number | Country | Date |
|---|---|---|
| 244,461 | Great Britain | Jan. 6, 1927 |
| 445,342 | Great Britain | Apr. 1, 1936 |
| 577,792 | Great Britain | May 31, 1946 |

OTHER REFERENCES

Journ. of Industrial and Engineering Chemistry, vol. 11, No. 5 (May 1919), pages 428-431.